United States Patent
Silver et al.

(10) Patent No.: US 7,519,166 B1
(45) Date of Patent: *Apr. 14, 2009

(54) TUNE MASTER CALLER IDENTIFICATION DEVICE

(75) Inventors: Edward Michael Silver, Atlanta, GA (US); Linda Ann Roberts, Decatur, GA (US); Hong Thi Nguyen, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1334 days.

This patent is subject to a terminal disclaimer.

(21) Appl. No.: 10/201,466

(22) Filed: Jul. 23, 2002

(51) Int. Cl.
*H04M 1/64* (2006.01)

(52) U.S. Cl. .............. 379/88.21; 379/142.06; 379/374.01; 455/415

(58) Field of Classification Search ........ 455/415, 455/414.1, 567; 379/142.01, 88.19, 93.05, 379/374.01, 88.21, 142.06; 375/132
See application file for complete search history.

(56) References Cited

U.S. PATENT DOCUMENTS

| | | | |
|---|---|---|---|
| 4,480,153 A * | 10/1984 | Festa | 379/374.01 |
| 5,384,831 A | 1/1995 | Creswell et al. | |
| 5,544,229 A | 8/1996 | Creswell et al. | |
| 6,144,724 A * | 11/2000 | Stovall | 379/93.05 |
| 6,314,306 B1 | 11/2001 | Harris | |
| 6,366,791 B1 | 4/2002 | Lin et al. | |
| 6,381,594 B1 | 4/2002 | Eichstaedt et al. | |
| 6,418,330 B1 * | 7/2002 | Lee | 455/567 |
| 6,697,470 B2 | 2/2004 | McDonough | |
| 6,707,908 B1 | 3/2004 | Nagasawa | |
| 6,804,289 B2 * | 10/2004 | Takahashi | 375/132 |
| 6,999,752 B2 * | 2/2006 | Fukaya | 455/412.1 |
| 7,031,453 B1 | 4/2006 | Busardo | |
| 7,127,238 B2 * | 10/2006 | Vandermeijden et al. | 455/415 |
| 7,197,135 B1 | 3/2007 | Silver et al. | |
| 7,356,132 B1 | 4/2008 | Silver | |
| 2002/0094076 A1 | 7/2002 | Chen | |
| 2002/0172338 A1 | 11/2002 | Lee et al. | |
| 2004/0037403 A1 | 2/2004 | Koch | |
| 2004/0067751 A1 * | 4/2004 | Vandermeijden et al. | 455/414.1 |

OTHER PUBLICATIONS

Softswitch Consortium; Reference Archectiture, Jun. 2002, vol. 1.2.

Commworks Position Paper; Softswitch Model Drives New Age of a Customized Communication, www.softswitch.org/education/reference.asp, in existence at least as of Sep. 9, 2002.

(Continued)

*Primary Examiner*—Gerald Gauthier
(74) *Attorney, Agent, or Firm*—Thomas, Kayden, Horstemeyer & Risley, LLP

(57) ABSTRACT

Systems for providing a tune master caller identification (ID) device include a telecommunications network and a caller device configured to provide caller identification information for an incoming telephone call, and a tune master caller ID device that is coupled to a telephone device. The tune master caller ID device receives caller identification information, associates a tune with the caller identification information, and plays the tune associated with the caller identification. The telephone device coupled to the tune master caller ID device provides telephone call processing capabilities. Other systems and methods are also provided.

20 Claims, 5 Drawing Sheets

OTHER PUBLICATIONS

Silver; Non-Final Rejection mailed Mar. 17, 2006 for U.S. Appl. No. 10/200,935, filed Jul. 23, 2002.
Silver; Final Rejection mailed Aug. 29, 2006 for U.S. Appl. No. 10/200,935, filed Jul. 23, 2002.
Silver; Non-Final Rejection mailed Apr. 9, 2007 for U.S. Appl. No. 10/200,935, filed Jul. 23, 2002.
Silver; Final Rejection mailed Aug. 14, 2007 for U.S. Appl. No. 10/200,935, filed Jul. 23, 2002.
Silver; Non-Final Rejection mailed Dec. 15, 2004 for U.S. Appl. No. 10/201,043, filed Jul. 23, 2002.
Silver; Final Rejection mailed Jul. 14, 2005 for U.S. Appl. No. 10/201,043, filed Jul. 23, 2002.
Silver; Notice of Allowance and Fees Due mailed Nov. 4, 2005 for U.S. Appl. No. 10/201,043, filed Jul. 23, 2002.
Silver; Notice of Allowance and Fees Due mailed May 4, 2006 for U.S. Appl. No. 10/201,043, filed Jul. 23, 2002.
Silver; Non-Final Rejection mailed Dec. 4, 2006 for U.S. Appl. No. 10/201,043, filed Jul. 23, 2002.
Silver; Final Rejection mailed Aug. 9, 2007 for U.S. Appl. No. 10/201,043, filed Jul. 23, 2002.
Silver; Advisory Action mailed Oct. 2, 2007 for U.S. Appl. No. 10/201,043, filed Jul. 23, 2002.
Silver; U. S. Patent Application filed Jul. 23, 2002, U.S. Appl. No. 10/201,043; entitled Tune Master Telephone.
Silver; U. S. Patent Application filed jul. 23, 2002, U.S. Appl. No. 10/200,935; entitled Tune Master Internet Protocol Device.
Silver; Final Rejection mailed Jul. 8, 2008 for U.S. Appl. No. 10/200,935, filed Jul. 23, 2002.

* cited by examiner

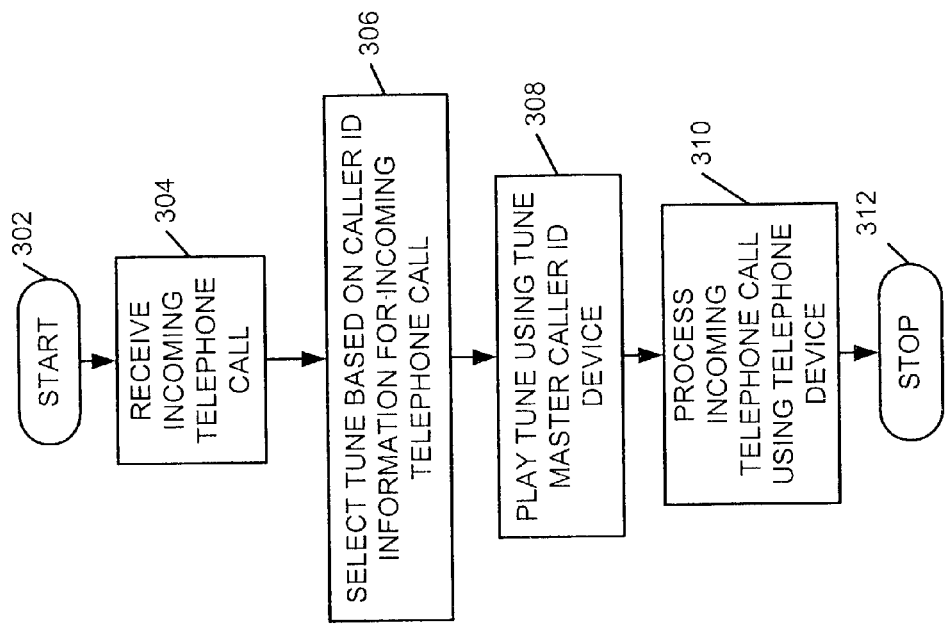

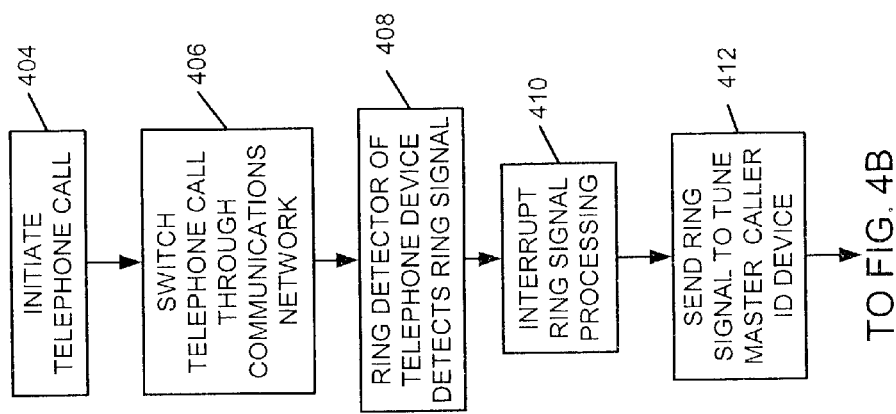

US 7,519,166 B1

TUNE MASTER CALLER IDENTIFICATION DEVICE

TECHNICAL FIELD

The present invention is generally related to telecommunications and, more particularly, is related to systems and methods for call ringing.

BACKGROUND OF THE INVENTION

Telephone users find it useful to know the identity of a person calling prior to answering a telephone call. One solution involves providing caller identification information to the called party. Generally, caller identification information includes area code, telephone number, name, and/or city and state information on the calling party. Typically, a user subscribes to a caller identification service from a telephone service provider that presents the caller identification information along with a ringing notification of an incoming telephone call. Effective use of caller identification information often requires the user to have a caller identification equipped telephone or other device, nearby when the telephone rings indicating an incoming call. This is often necessary so that the user can view a display showing the caller identification information prior to answering the call. However, a user may not always be near the device that displays the caller identification information, and thus may not have an opportunity to determine who is calling before answering the telephone.

Thus, a heretofore-unaddressed need exists for a solution that addresses the aforementioned deficiencies and inadequacies.

SUMMARY OF THE INVENTION

The preferred embodiments of the present invention provide systems and methods for a tune master caller identification (ID) device.

Briefly described, in architecture, one preferred embodiment of the system, among others, can be implemented as follows. A tune master caller ID system includes a tune master caller ID device having an associated telephone device coupled thereto that provides telephone call processing capabilities. The tune master caller ID device is coupled to a telecommunications network configured to provide caller identification information for an incoming telephone call from a caller device. The tune master caller ID device receives caller identification information, associates a previously stored tune with the caller identification information in accordance with user configuration, and plays the tune associated with the caller identification.

The preferred embodiment of the present invention can also be viewed as providing methods for a tune master caller ID device. In this regard, one embodiment of such a method, among others, can be broadly summarized by the following steps: receiving caller identification information for an incoming telephone call; correlating a previously stored tune with the caller identification information in accordance with user configuration; sending a ring signal to a tune master caller ID device; and playing the tune on the tune master caller ID device as notification of the incoming telephone call.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3 is a flow chart depicting functionality of a preferred embodiment of an implementation of a tune master caller ID device system.

FIGS. 4A and 4B are flow charts depicting more specific functionality of a preferred embodiment of an implementation of a tune master caller ID device system.

DETAILED DESCRIPTION OF THE PREFERRED EMBODIMENTS

Disclosed herein are systems and methods for a tune master caller ID device. To facilitate description of the inventive system, an example system that can be used to implement the systems and methods for a tune master caller ID device is discussed with reference to the figures. Although this system is described in detail, it will be appreciated that this system is provided for purposes of illustration only and that various modifications are feasible without departing from the inventive concept. After the example system has been described, an example of the operation of the system will be provided to explain the manner in which the system can be used to provide a tune master caller ID device.

Figure 1:
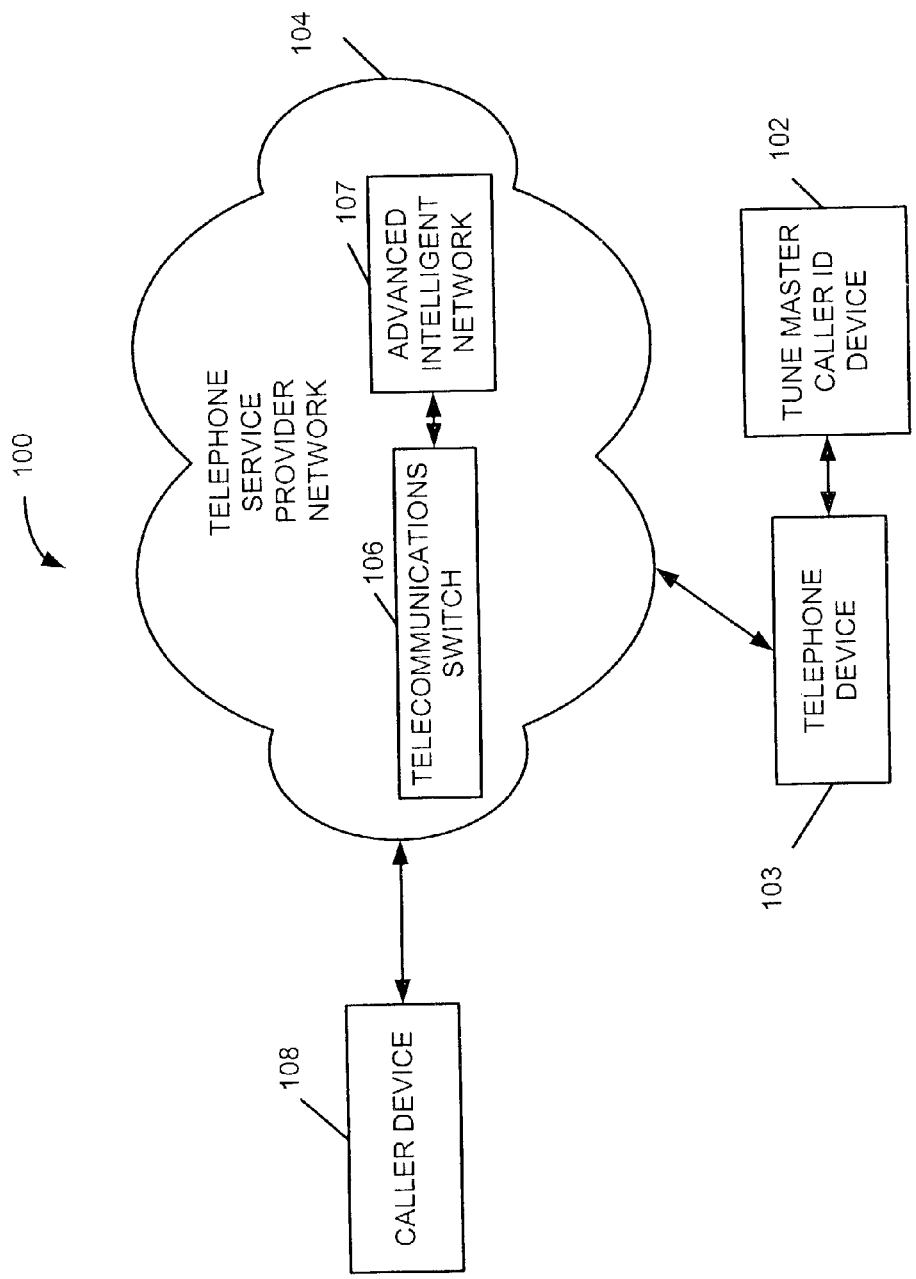
FIG. 1 is a block diagram depicting a preferred embodiment of a tune master caller ID device system.

Referring now in more detail to the drawings, in which like numerals indicate corresponding parts throughout the several views, FIG. 1 is a block diagram depicting a preferred embodiment of a tune master caller ID device system 100 that includes a tune master caller ID device 102 coupled to a communications device, such as a telephone device 103 that couples to a service provider network 104. In a preferred embodiment, the telephone device 103 includes a telephone, or a combination telephone and answering machine, among others. The telephone service provider network 104 may be any type of communications network employing any network topology, transmission medium, or network protocol. For example, such a network may be any public or private packet-switched or other data network, including the Internet, circuit-switched network, such as a public switched telecommunications network (PSTN), wireless network, or any other desired communications infrastructure and/or combination of infrastructure. The telephone service provider network 104 may include a telecommunications switch 106 and an advanced intelligent network 107 which are coupled, directly or indirectly, to the telephone device 103 or tune master caller ID device 102. The advanced intelligent network 107 separates telephone service logic from switching equipment, such as telecommunications switch 106, and allows for distributed network intelligence.

In one preferred embodiment, the telecommunications switch 106 is encompassed in a public switched telecommunications network. In another preferred embodiment, the telecommunications switch 106 includes a packet-based "soft-switch" that uses software control to provide voice, data, and video services by dynamically changing its connection data rates and protocol types. In still another preferred embodiment, the telecommunications switch 106 supports advanced intelligent network (AIN) 107 componentry that controls many features of the telecommunications switch 106.

In a preferred embodiment, the user of the tune master caller ID device 102 subscribes to a caller identification service, such as a service provided by BellSouth Corporation. Caller identification information can include, for instance, a telephone number of the calling party, name of the calling party, or city and state of the calling party. For purposes of this invention, one emphasis is on receiving the telephone number of the calling party as part of the caller identification information. In a preferred embodiment, the tune master caller ID device 102 is configured to receive and recognize caller identification information.

In a preferred implementation of this invention, a user of the caller device 108 initiates a telephone call. The incoming call and associated caller identification information is switched through at least one telecommunications switch 106 using transmission facilities of the telephone service provider network 104, as is well known in the art. The incoming call i.e., call request signalling, such as a ring indication from telecommunications switch 106, reaches the telephone device 103, that is coupled to the tune master caller ID device 102. In a preferred embodiment, a user of the tune master caller ID device 102 previously associated a particular tune with a particular telephone number. The telephone device 103 does not ring using a standard ringtone. The ring signal and associated caller identification information is sent to the tune master caller ID device 102. In response to receiving the call request signalling, which would typically cause conventional telephones to simply ring as usual and optionally display caller identification information if available, the tune master caller ID device 102 selects the tune from its storage device that is associated with the caller identification information of the incoming call. The tune is played as a "ring" of the tune master caller ID device 102. The user of the tune master caller ID device 102 is able to recognize the identity of the caller based on the tune played by the tune master caller ID device 102. The tune master caller ID device 102 sends a signal to the telephone device 103 indicating that the tune master caller ID device 102 is playing a tune and such that the telephone device 103 can continue processing the incoming call, including completing the connection between the calling party and the called party.

Figure 2:
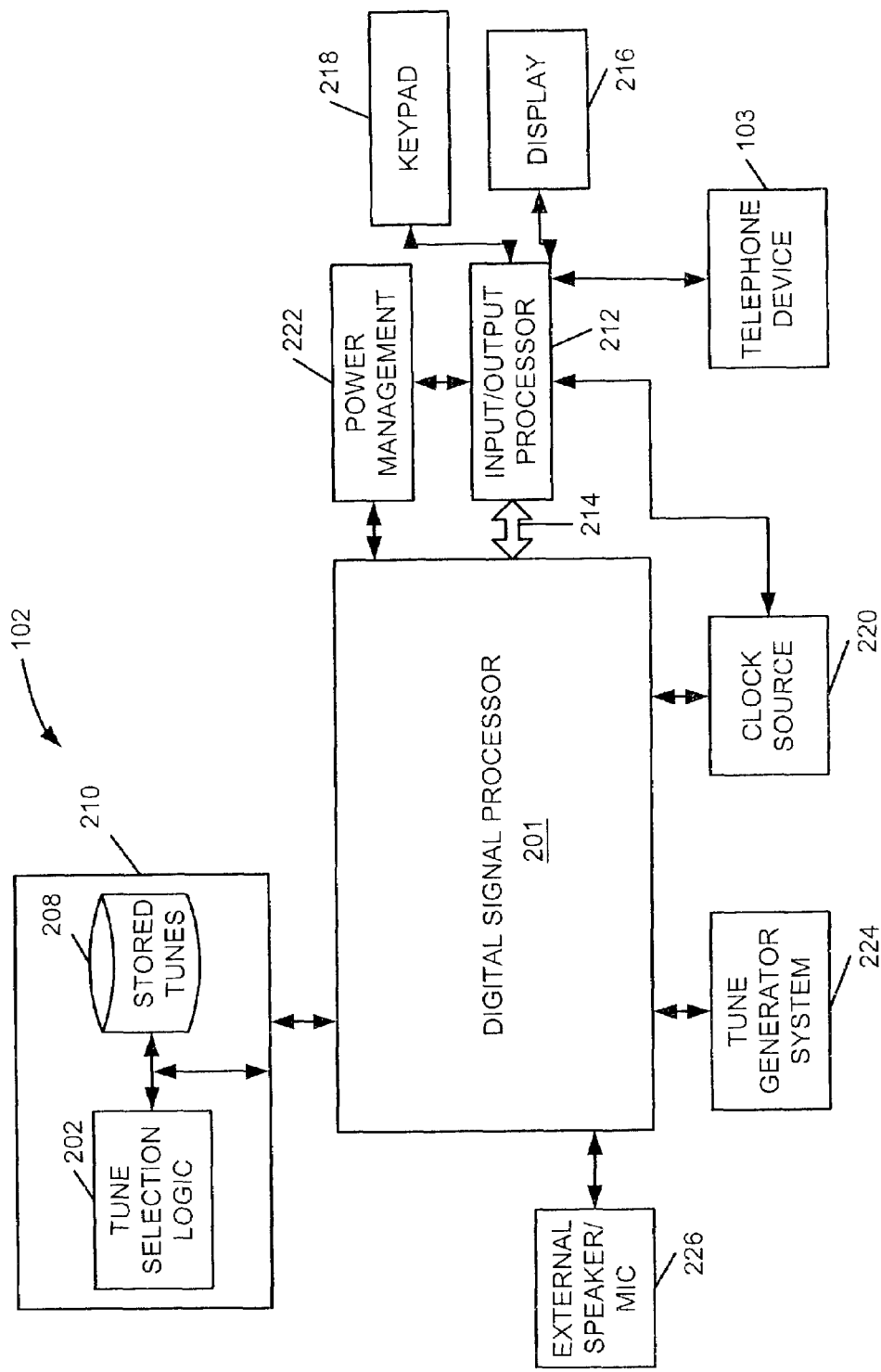
FIG. 2 is a block diagram depicting a preferred embodiment of an apparatus for implementing a tune master caller ID device system.

FIG. 2 is a block diagram depicting a preferred embodiment of an implementation of the tune master caller ID device 102 for playing tunes. The tune master caller ID device 102 generates a tune (or song, melody, etc.) as a ringtone for an incoming telephone call. The time master caller ID device 102 includes tune selection logic 202 and stored tunes 208 located in a memory 210 connected to (or alternatively located within) a digital signal processor 201. Tune selection logic 202 can be implemented in software (e.g., programming stored on a medium, firmware, etc.), hardware, or a combination thereof. In other embodiments, the memory 210 is located external to the tune master caller ID device 102. However, a storage device for stored tunes 208 can include a CD-ROM, DVD, tape, cassette tape, floppy diskette, or other external or internal memory of the tune master caller ID device 102. In a preferred embodiment, the tunes are selected from a list of pre-programmed tunes. In another preferred embodiment, the tunes are organized according to categories such as tunes for business associates, family members, or other associates. The number and type of tunes is only limited by imagination and available space in the external or internal memory of the tune master caller ID device 102.

The digital signal processor 201 converts analog signals to digital signals and converts digital signals to analog signals. The digital signal processor 201 could include compression and decompression algorithms, cancellation algorithms, audio-processing circuitry, filter circuitry, and amplification circuitry. Although digital signal processor 201 can be designed to provide differing capabilities and a variety of performance criteria, the basic functions of the digital signal processor 201 are known, and thus, will not be further discussed.

The digital signal processor 201 interfaces with an input/output processor 212. The input/output processor 212 controls system 110 and provides telephony-like control features. A bus 214 provides a signal communication path between the digital signal processor 201 and the input/output processor 212. In a preferred embodiment, the input/output processor 212 is a microprocessor that includes memory (not shown), communication controllers (not shown), and peripheral controllers (not shown). The communication controllers, for example, could control packet-based communications with the telecommunications switch 106 through a network port (not shown). The peripheral controllers provide an interface with a display 216, such as a LCD/LED/CRT display and with telephony-like control features, such as a keypad 218. A clock source 220 provides a system clock for the digital signal processor 201, and the clock source 220 may also include higher and lower frequency multiples of a system clock depending upon power requirements and power availability. A power management system 222 provides differing power control mechanisms, such as a sleep mode and a low power mode, to efficiently utilize available power and to reduce thermal management concerns.

The memory 210 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 210 may incorporate electronic, magnetic, optical, and/or other types of storage media. Note that the memory 210 can have a distributed architecture, where various components are situated remote from one another, but can be accessed by the processing device 201. The software and/or firmware in memory 210 may include one or more separate programs, each of which comprises an ordered listing of executable instructions for implementing logical functions.

The tune selection logic 202 is preferably a source program, executable program (object code), script, or any other entity comprising a set of instructions to be performed. When the tune selection logic 202 is implemented as a source program, then the program needs to be translated via a compiler, assembler, interpreter, or the like, which may or may not be included within the memory 210. Furthermore, tune selection logic 202 can be written as (a) an object oriented programming language, which has classes of data and methods, or (b) a procedure programming language, which has routines, subroutines, and/or functions, for example but not limited to, C, C++, Pascal, Basic, Fortran, Cobol, Pert, Java, and Ada.

When the tune selection logic 202 is implemented in software the tune selection logic 202 can preferably be stored on any computer-readable medium for use by or in connection with any computer related system or method. The tune selection logic 202 can be embodied in any computer-readable medium for use by or in connection with an instruction execution system, apparatus, or device; such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the compute-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and an optical fiber (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. If implemented in hardware, as in an alternative embodiment, the tune selection logic 202 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The digital signal processor 201 interfaces with a tune generation system 224. In a preferred embodiment, the tune generation system 224 executes the selected tune and provides the tune. Execution of the selected tune can include correlating the incoming caller identification information with a tune associated with the caller identification information, and then playing the tune in place of the standard ringtone. In another preferred embodiment, the tune generation system 224 plays the standard ringtone as a default if the caller identification information does not have a tune associated with it, or the caller identification information is not presented to the digital signal processor 201. In another preferred embodiment, the tune generation system 224 plays a selectable default tune when no caller identification information is presented. The tune generation system 224 and the digital signal processor 201 could also interface with an external speaker/microphone (mic) system 226 to audibly present the selected tune.

FIG. 3 is a flow chart depicting general functionality (or a method) of a preferred embodiment of an implementation of a tune master caller ID device system. The process begins at 302. At 304, an incoming telephone call is received by a telephone. In a preferred embodiment, the telephone call, i.e., ring signalling, is sent to the telephone device with, or nearly with, associated caller identification information. The telephone device interrupts normal ring detection process and the ring signalling is sent to a tune master caller ID device. At 306, before ringing, the tune master caller ID device selects a tune to use as the ringing notification, based on tunes associated with the caller identification information for the incoming telephone call. At 308, the tune master caller ID device plays the tune selected at 306. At 310, normal call processing continues with the telephone processing the incoming call. In a preferred embodiment, the tune master caller ID device sends a notification to the telephone device that it is "ringing" and the telephone device completes the incoming call providing a connection between the calling party and the called party. The process ends at 312.

Figure 4B:
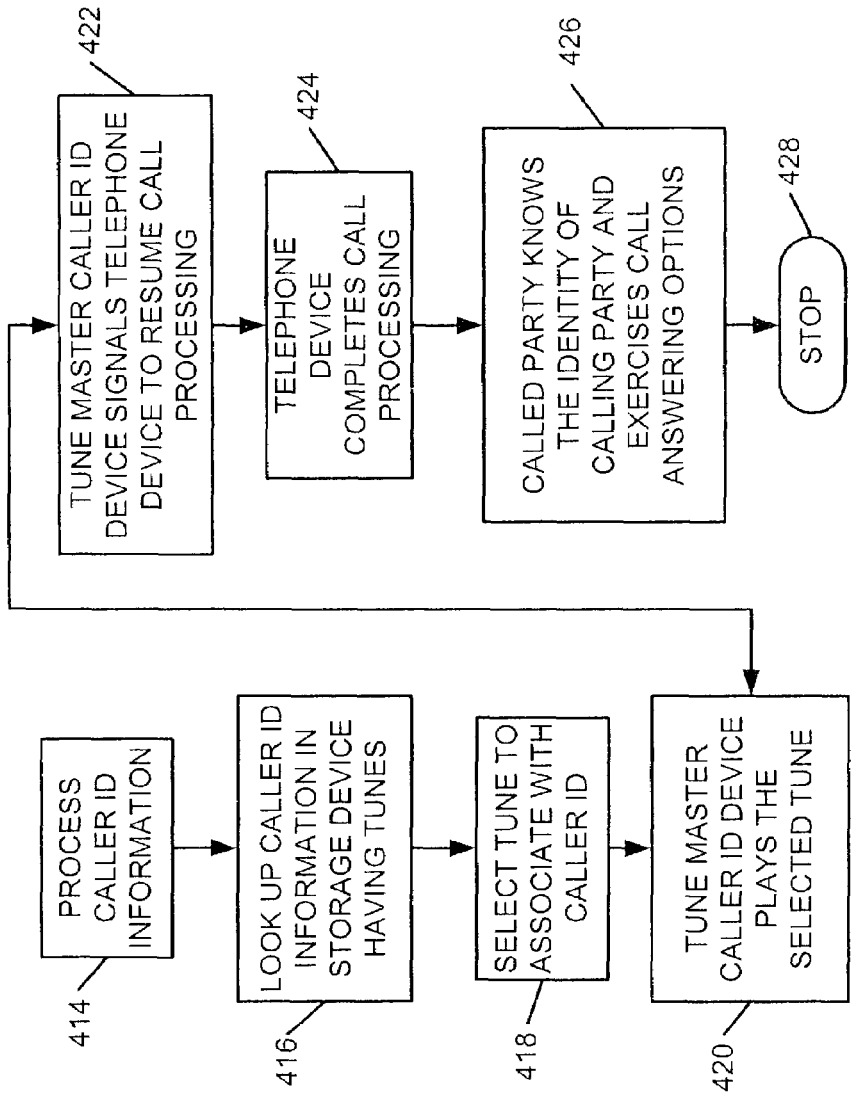

FIGS. 4A and 4B are flow charts depicting more specific functionality (or a method) of a preferred embodiment of an implementation of a tune master caller ID device system. Referring to FIG. 4A, the process can be construed as beginning at 404, with a caller initiating a telephone call from a caller device to the telephone device. In a preferred embodiment, the telephone call, i.e., ring signalling, has caller identification information associated with it. At 406, the telephone call is switched and/or routed through the communications network to a telephone device having a tune master caller ID device coupled to the telephone device. At 408, a ring detector system of the telephone detects the ring signal from the communications network. In response to receiving the call request signalling, which would typically cause conventional telephone to simply ring as usual and optionally display caller identification information if available, however, at 410, the ring signalling processing is interrupted. At 412, a processing device in the tune master caller ID device recognizes that this is an incoming call having caller identification information and read the caller identification information before the associated telephone device rings with a standard ring tone.

Referring to FIG. 4B, at 414, the tune master caller ID device processes the caller identification information recognizing the need to correlate a tune with this particular caller. At 416, the tune master caller ID device looks up the caller identification information in a storage device having tunes. In a preferred embodiment, the storage device is an internal memory of the tune master caller ID device having a table that correlate tunes to caller identification information, such as telephone numbers. In another preferred embodiment, the storage device is an external memory accessible to the tune master caller ID device having a table that correlate tunes to telephone numbers. In still another preferred embodiment, the storage device is a tape cartridge associated with the tune master caller ID device that plays tunes as directed by the tune master caller ID device. At 418, the tune master caller ID device selects the tune associated with the caller identification information. At 420, the tune master caller ID device plays the selected tune. At 422, the tune master caller ID device signals the telephone to resume call processing. At 424, the telephone device completes call processing to connect the calling party to the called party. At 426, the called party who now knows the identity of the calling party, exercises a plurality of call answering options. For instance, the called party can allow an answering system/service to answer the call, answer the call or ignore the call. In a preferred embodiment, if the tune master caller ID device is unable to correlate a tune to a caller identification information, or if the caller identification information is not presented to the tune master caller ID device, the tune master caller ID device rings using a default ring. In another preferred embodiment, the default ring is a default tune selected by the user or a standard ring tone. The process ends at 428.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. An apparatus, comprising:
   a storage device having a tune associated with a telephone number of an incoming telephone call;
   a processor adapted to communicate with the storage device, to select a tune associated with the telephone number and to play the tune as an audible notification of the incoming telephone call; and
   a network interface coupled to the processor and an external communications device, the network interface adapted to provide communications between the processor and the external communications device, thereby alerting a called party to answer the external communications device connected to the network interface.

2. The apparatus of claim 1, wherein the processor is configured to receive notification from the external communications device to play the tune, and to send notification to the external communications device to connect the incoming telephone call with a calling party.

3. The apparatus of claim 1, wherein the processor plays a default tune if a tune is not associated with the telephone number.

4. The apparatus of claim 1, wherein the storage device comprises at least one of a CD-ROM, DVD, tape, cassette, floppy disk, memory card, large capacity disk, or internal memory.

5. The apparatus of claim 1, wherein the telephone number of the incoming telephone call is derived from caller identification information.

6. The apparatus of claim 1, wherein the processor plays a standard tune if caller identification information is not received.

7. The apparatus of claim 1, wherein the incoming telephone call is received over an advanced intelligent network.

8. A method comprising:
   communicating with a storage device to select a tune associated with a telephone number of an incoming telephone call;
   playing the tune as an audible notification of the incoming telephone call; and
   communicating with an external communications device over a network interface coupled to the external communications device, thereby alerting a called party to answer the external communications device connected to the network interface.

9. The method of claim 8, further comprising receiving notification from the external communications device to play the tune.

10. The method of claim 9, further comprising sending notification to the external communications device to connect the incoming telephone call with a calling party.

11. The method of claim 8, further comprising playing a default tune if no tune is associated with the telephone number.

12. The method of claim 8, wherein the telephone number of the incoming telephone call is derived from caller identification information.

13. The method of claim 12, further comprising playing a standard tune if caller identification information is not received.

14. The method of claim 8, wherein the incoming telephone call is received over an advanced intelligent network.

15. A method comprising:
   communicating with a storage device to select a tune associated with caller identification information derived from a telephone number of an incoming telephone call;
   playing the tune as an audible notification of the incoming telephone call; and
   communicating with an external communications device over a network interface coupled to the external communications device, thereby alerting a called party to answer the external communications device connected to the network interface.

16. The method of claim 15, further comprising receiving notification from the external communications device to play the tune.

17. The method of claim 16, further comprising sending notification to the external communications device to connect the incoming telephone call with a calling party.

18. The method of claim 15, further comprising playing a default tune if no tune is associated with the telephone number.

19. The method of claim 15, further comprising playing a standard tune if caller identification information is not available.

20. The method of claim 15, wherein the incoming telephone call is received over an advanced intelligent network.

* * * * *